United States Patent [19]
Miller

[11] Patent Number: 5,619,568
[45] Date of Patent: Apr. 8, 1997

[54] CORDLESS PHONE WITH TIME-OUT CONTROLLED RINGER

[75] Inventor: Jerry A. Miller, Ringwood, N.J.

[73] Assignees: Sony Corporation, Japan; Sony Electronics Inc., N.J.

[21] Appl. No.: 505,967

[22] Filed: Jul. 24, 1995

[51] Int. Cl.⁶ .................................................. H04M 11/02
[52] U.S. Cl. ...................... 379/413; 379/61; 379/188; 379/190; 379/373; 455/38.3; 455/127
[58] Field of Search ................................. 379/413, 373, 379/375, 377, 185, 190, 199, 61, 200, 442, 188, 58; 455/343, 127

[56] References Cited

U.S. PATENT DOCUMENTS

| | | | |
|---|---|---|---|
| 2,338,218 | 1/1944 | Vroom | 379/188 |
| 3,867,584 | 2/1975 | Rengren | 379/199 |
| 3,962,553 | 6/1976 | Linder et al. | 379/61 |
| 4,405,839 | 9/1983 | Groff | 379/188 |
| 4,481,382 | 11/1984 | Villa-Real | 379/68 |
| 4,893,329 | 1/1990 | O'Brien | 379/88 |
| 4,924,499 | 5/1990 | Serby | 379/200 |
| 4,939,770 | 7/1990 | Makino | 379/61 |
| 4,992,720 | 2/1991 | Hata | 379/61 |
| 5,111,499 | 5/1992 | Umemoto et al. | 379/413 |
| 5,170,429 | 12/1992 | Stocklin et al. | 379/413 |
| 5,303,284 | 4/1994 | Shinozaki | 379/58 |
| 5,317,632 | 5/1994 | Ellison | 379/200 |
| 5,381,472 | 1/1995 | Kobayashi et al. | 379/413 |

*Primary Examiner*—Krista M. Zele
*Assistant Examiner*—Jacques M. Saint-Surin
*Attorney, Agent, or Firm*—Ronald P. Kananen

[57] ABSTRACT

A cordless telephone system comprises a base unit and a portable handset having a rechargeable battery. To conserve battery power in the handset, the ringer is normally in an inactive state but may be switched active for a predetermined period of time. Thus, if the handset is within the range of other telephones within a household, the ringer on the handset will normally not be activate and the ringer on the handset will not indicate the receipt of an incoming call. To activate the ringer for the predetermined period of time, which would be desired when the handset is out of range of the other telephones, the user presses a timer switch for activating a timer. A CPU in the handset then enables the ringer while the timer is counting down the predetermined period of time. In another embodiment, the user can enter a desired period of time during which the ringer is active.

16 Claims, 2 Drawing Sheets

CORDLESS PHONE WITH TIME-OUT CONTROLLED RINGER

BACKGROUND OF THE INVENTION

1. Field of the Invention

This invention relates to an apparatus for conserving battery power and, more particularly, to an apparatus for controlling a ringer on a cordless telephone.

2. Background

A typical cordless telephone, such as the one disclosed in U.S. Pat. No. 4,992,720 issued to Hata, is comprised of a base unit and a portable handset which both have antennas and transceivers for communicating with each other. When the handset is removed from the base unit, a battery in the handset powers the transceiver and other electronics in the handset to allow the portable operation of the telephone. The description of the cordless telephone in U.S. Pat. No. 4,992,720 is hereby incorporated by reference.

The battery on the handset has a limited charge and must be periodically recharged by returning the handset to the base unit. The base unit detects the battery in the handset and begins a trickle charge operation which takes an amount of time which varies according to the strength of the battery.

The primary benefit of the cordless phone is that the handset need not be at a fixed location and need not be located close to the base unit. As a result, the handset is commonly away from the base unit and is not returned to the base unit for recharging as often as necessary. Consequently, the battery in the handset may not be at full strength and the length of time that the handset is operable is therefore limited.

When an incoming call is received over a telephone line, the base unit signals the handset of the incoming call and the handset operates a ringer. The operation of the ringer at the handset substantially reduces the life of the battery. In a household with more than one telephone, the ringer for each telephone in the household will be activated by the incoming call. Because of the other telephones, the operation of the ringer on the handset may not be necessary to inform the resident of the incoming call.

Many cordless telephones have a ringer switch which enables a user to simply turn on or off the ringer at his or her convenience. Some people, however, may not know about the ringer switch or may not know the value of turning the ringer off with the switch. Furthermore, many people do not want to bother with switching the ringer on and off, especially since they may forget that the ringer has been switched off when they actually want the ringer active. A need therefore exists for a cordless telephone that conserves battery power by deactivating the ringer when the ringer is not necessary.

SUMMARY OF THE INVENTION

It is an object of the invention to provide an apparatus which conserves battery power on a cordless phone.

It is another object of the invention to provide an apparatus which enables a ringer on a cordless phone for a predetermined period of time.

It is another object of the invention to provide an apparatus which enables a ringer on a cordless phone for a user defined period of time.

It is a further object of the invention to increase the time that a cordless phone battery can be away from its charger or base unit.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objects, in accordance with the present invention, as embodied and broadly described herein, a battery powered telephone handset, for use in a cordless telephone system having a base unit, comprises a timer switch for starting a timer. The timer counts down a period of time and generates an active signal during this period of time. A controller causes a ringer to indicate an incoming telephone call only when the active signal is received from the timer. Thus, the ringer in the handset is active only when the timer has been activated.

The handset preferably has a display for indicating when the ringer is active. The timer may count down a predetermined period of time or a variable period of time which is entered through a keypad. The handset may additionally have a ringer switch for disabling the ringer regardless of whether the time period has expired. With the invention, the life of the battery in the handset is prolonged by having the ringer normally disabled and by requiring the user to activate the ringer.

BRIEF DESCRIPTION OF THE DRAWINGS

The accompanying drawings, which are incorporated in, and form a part of, the specification, illustrate embodiments of the present invention and, together with the description, serve to explain the principles of the invention. In the drawings.

DETAILED DESCRIPTION OF THE PREFERRED EMBODIMENT

Reference will now be made in detail to the preferred embodiments of the invention, examples of which are illustrated in the accompanying drawings.

Figure 1:
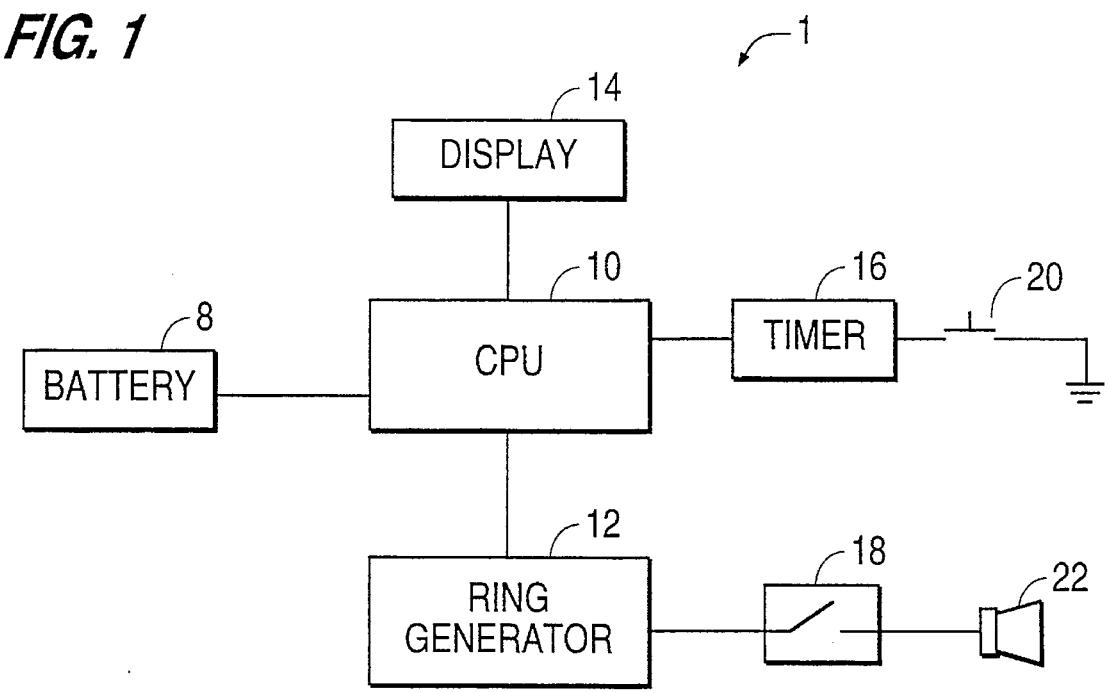
FIG. 1 is a block diagram of a first embodiment of the invention.

With reference to FIG. 1, a handset 1 of a cordless telephone system comprises a rechargeable battery 8, computer or CPU 10, a display 14, a timer 16, a timer switch 20, a ring generator 12, a ringer switch 18, and a ringer 22. The rechargeable battery 8 powers the CPU 10 as well as the other elements comprising the handset 1. The handset 1 is shown with only the parts relevant to the invention, with the other parts, such as those disclosed in U.S. Pat. No. 4,992,720, being removed to clarify the description of the invention.

When the timer switch 20 is depressed, the timer 16 is activated to supply the CPU 10 with an active signal for a predetermined amount of time, which thus enables the ringer for the predetermined period of time. The predetermined period of time is preferably 30 minutes, but could be a longer or shorter period of time. By subsequent activations of the timer switch 16, the time period can be changed to multiples of the predetermined amount of time. Thus, the user can increase the time period in increments of 30 minutes by repeated actuation of timer switch 20. The timer 16 may include a counter with a pre-loaded count, an RC circuit, or any other suitable type of circuitry for generating a signal for a predetermined amount of time. During this time, the active signal indicates to the CPU 10 that the ringer 22 is enabled. Thus, during this time, if an incoming call is received, the CPU will signal the ring generator 12 to activate the ringer 22.

When the ringer switch 18 is in an open circuit state, the ringer 22 is disabled, regardless of whether the timer 16 is active. On the other hand, when the switch 18 is in a closed circuit state, the ringer 22 may be activated as long as the timer 16 has also been activated. Therefore, battery life can be conserved by turning the ringer switch 18 to its open circuit or ringer off state.

The CPU 10 is connected to a display 14 for indicating the status of the ringer 22. The display 14 may simply comprise an LED or LCD indicator which is lighted when the timer 16 is active and extinguished when the timer 16 is inactive. Alternatively, or in addition, the display 14 can display a countdown of the time remaining on the timer. The handset 1 may have other indicators as well, such as an alarm which sounds when the ringer 22 goes from an active state to an inactive state. This alarm could further provide a warning to a user that the ringer 22 will go inactive, for instance, a minute before the expiration of the time period.

Figure 2:
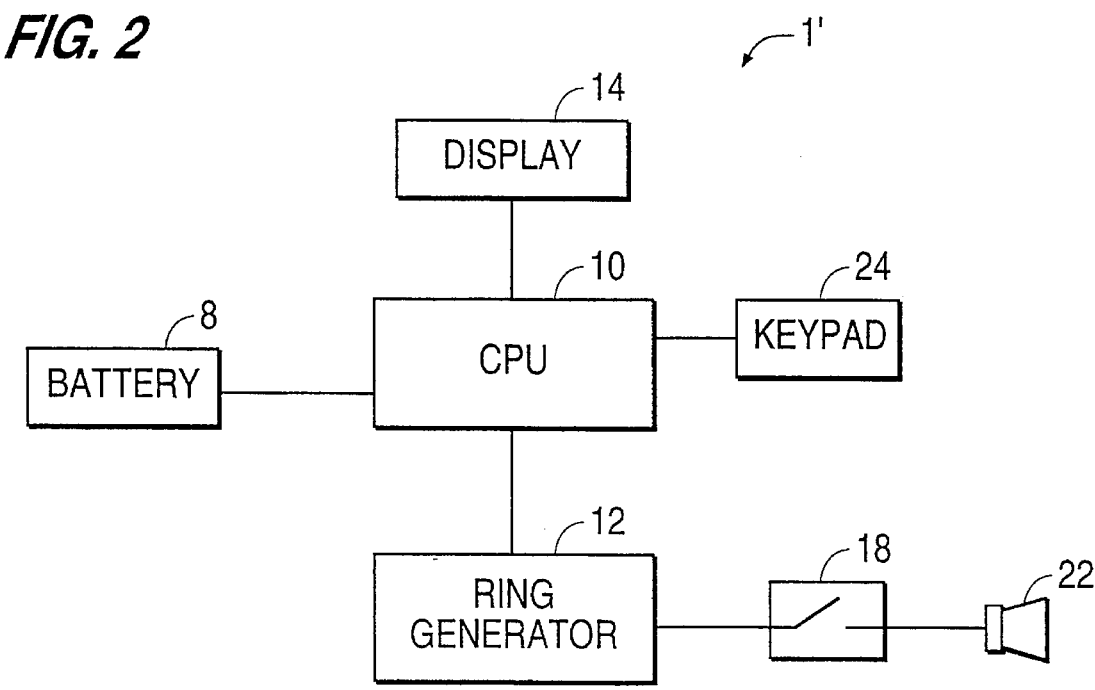
FIG. 2 is a block diagram of a second embodiment of the invention.
Figure 3:
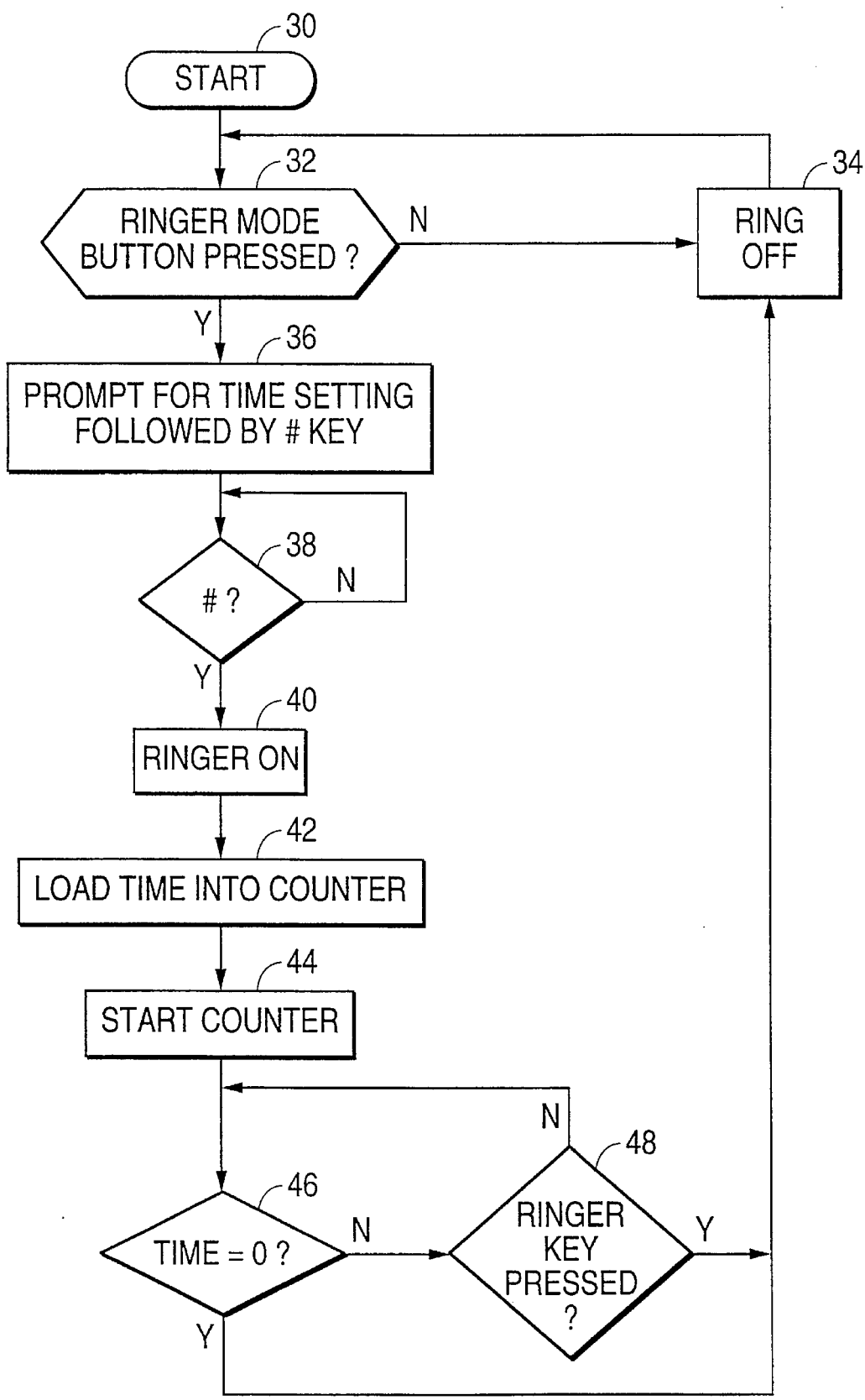
FIG. 3 is a flow chart of operation for the second embodiment.

In a second embodiment of the invention, as shown in FIG. 2, a handset 1' has a keypad 24 for programming the CPU 10 with a user defined period of time. With reference to a flow chart of operations in FIG. 3, at step 32 the CPU 10 first checks whether a ringer mode button has been pushed. If the button has not been pushed, the ringer 22 is turned off at step 34 and the routine returns to the beginning. When the ringer button has been pushed, at step 36 the CPU 10 prompts the user for the user defined time period. The display 14 may include an LCD display and the CPU 10 may prompt the user through the LCD display. The prompt could alternatively be accomplished by flashing an LED or by sounding tones or beeps with the ringer 22.

At step 38, the user then enters the time period followed by the pound sign "#." The entry of the pound sign "#" indicates to the CPU 10 that the time period has been entered. As an alternative, the keypad 24 could comprise buttons in addition to those normally found on a telephone handset, such as an enter key which would be depressed following the entry of the time period. At step 40, the CPU 10 turns the ringer 22 on and at step 42 the time period is loaded into a counter. For the embodiment shown in FIG. 2, the counter is an internal counter within the CPU 10. This counter could alternatively be an additional element which is connected to the CPU 10, such as the timer 16 in FIG. 1.

Once the time period has been loaded into the counter, at step 44 the counter is started. When the counted time is not equal to zero, as determined at step 46, the CPU 10 next determines at step 48 whether the ringer switch 18 is pressed. With the time not equal to zero and the ringer switch 18 not pressed, the routine loops through steps 46 and 48 maintaining the ringer 22 in the activated state. When either the time runs down to zero or the ringer switch 18 is opened, the ringer 22 is turned off at step 34 and the routine returns to the beginning.

With the invention, the life of the battery 8 can be substantially prolonged since the ringer 22 is normally disabled. Consequently, the battery 8 normally does not power the ringer 22 when an incoming telephone call is received. Instead, the user must take active steps to begin the time period during which the ringer 22 is active. With the invention, inactivity with the user results in a conservation of power in the battery 8, whereas before inactivity would maintain the ringer 22 ill an active state and would drain the power in the battery 8.

Thus, the user can activate the ringer, for example, when leaving the house with the telephone. The user can then be alerted to incomming calls while away from other telephone ringers located within the house. After expiration of the time period, the telephone automatically reverts back to normal operation without the operation of the ringer.

The foregoing description of the preferred embodiments of the invention has been presented for purposes of illustration and description. It is not intended to be exhaustive or to limit the invention to the precise forms disclosed. Many modifications and variations are possible in light of the above teaching.

For example, the invention has been described with reference to a cordless telephone which is described in U.S. Pat. No. 4,992,720 to Hata. The invention is not limited to the handset or base unit in this patent but rather the invention may be embodied in any type of cordless telephone having a limited power supply. Also, the programming of the CPU 10 is only an example of a possible operation of the handset 1' and may vary from that shown in FIG. 3.

The embodiments were chosen and described in order to best explain the principles of the invention and its practical application to thereby enable others skilled in the art to best utilize the invention and various embodiments and with various modifications as are suited to the particular use contemplated. It is intended that the scope of the invention only be limited by the claims appended hereto.

I claim:

1. A circuit for use in a cordless telephone system, comprising:

a timer; and a timer switch for starting said timer;

wherein said timer generates an active signal for a period of time after being started;

a controller for receiving said active signal; and a ringer controlled by said controller to indicate an incoming telephone call;

wherein said controller causes said ringer to indicate said incoming telephone call only during said period of time when said controller receives said active signal from said timer, whereby said ringer is active only for said period of time.

2. The circuit as set forth in claim 1, wherein said period of time is a predetermined period of time.

3. The circuit as set forth in claim 1, further comprising a ring generator, connected between said controller and said ringer, for driving said ringer when said ring generator receives a control signal from said controller, said controller generating said control signal only when an incoming call is received and while said controller is receiving said active signal.

4. The circuit as set forth in claim 1, further comprising a ringer switch connected between said ring generator and said ringer for disabling said ringer while said active signal is received by said controller.

5. The circuit as set forth in claim 1, further comprising a display for indicating whether said active signal is received by said controller and for thereby indicating whether said ringer is active.

6. The circuit as set forth in claim 1, further comprising a keypad for defining said period of time.

7. The circuit as set forth in claim 1, wherein said controller comprises a central processing unit.

8. The circuit as set forth in claim 1, wherein said period of time is determined by the number of times said timer switch is actuated.

9. A battery powered telephone handset, comprising:

a telephone handset a timer switch on said handset;

a timer responsive to said timer switch for generating an active signal for a period of time following actuation of said timer switch;

a ringer in said handset for indicating an incoming telephone call; and means for enabling said ringer only during said period of time.

10. The handset as set forth in claim 9, wherein said period of time is a predetermined period of time.

11. The handset as set forth in claim 9, wherein said period of time is determined by the number of times said timer switch is actuated.

12. A circuit for use in a battery powered telephone handset, comprising:

a timer for generating an active signal for a period of time;

activating means for activating said timer;

a ringer for indicating an incomming telephone call; and means for disabling said ringer except during said period of time.

13. The circuit as set forth in claim 12, wherein said activating means includes a timer switch.

14. The circuit as set forth in claim 13, wherein said period of time is determined by the number of times said timer switch is actuated.

15. The circuit as set forth in claim 12, wherein said activating means includes a keypad for entering the length of said period of time.

16. A battery powered telephone handset for use in a cordless telephone system having a base unit, comprising:

a telephone handset;

a telephone base unit;

a timer for generating an active signal for a period of time;

a timer switch for starting a timer upon actuation of said timer switch;

a controller including a programmed central processing unit for receiving said active signal;

a ringer controlled by said controller to indicate an incoming telephone call;

a ring generator, connected between said controller and said ringer, for driving said ringer when said ring generator receives a control signal from said controller, said controller generating said control signal only when an incoming call is received and said central processing unit receives said active signal;

a ringer switch connected between said ring generator and said ringer for disabling said ringer;

wherein said controller causes said ringer to indicate said incoming telephone call only during said period of time when said controller receives said active signal from said timer, whereby said ringer is active only for said period of time; and a display for indicating whether said active signal is received by said controller and for thereby indicating whether said ringer is active.

\* \* \* \* \*